United States Patent [19]

Nonaka et al.

[11] Patent Number: 5,286,855
[45] Date of Patent: Feb. 15, 1994

[54] PROCESS FOR PRODUCING POLYHALOGENATED PHTHALOCYANINE

[75] Inventors: Yoshiyuki Nonaka; Junichi Tsuchida; Masami Shirao; Michichika Hikosaka, all of Tokyo, Japan

[73] Assignee: Toyo Ink Manufacturing Co., Ltd., Tokyo, Japan

[21] Appl. No.: 789,076

[22] Filed: Nov. 7, 1991

[30] Foreign Application Priority Data

Nov. 9, 1990 [JP] Japan ............................ 2-305856

[51] Int. Cl.$^5$ ............................................. C09B 47/10
[52] U.S. Cl. ................................. 540/138; 540/136; 540/137
[58] Field of Search ..................... 540/136, 137, 138

[56] References Cited

U.S. PATENT DOCUMENTS 4,695,436  9/1987  Wyndham et al. ................. 423/135
4,948,884  8/1990  Nonaka et al. ...................... 540/138

FOREIGN PATENT DOCUMENTS 0397939 11/1990  European Pat. Off. .

OTHER PUBLICATIONS

Toyo Ink, Patent Abstracts of Japan, vol. 14, No. 47, (C-682)(3990), Jan. 29, 1990 JP-A-1279975, Nov. 10, 1989.

Primary Examiner—Paul R. Michl
Assistant Examiner—Jyothsna Venkat
Attorney, Agent, or Firm—Wenderoth, Lind & Ponack

[57] ABSTRACT

A process for producing a polyhalogenated phthalocyanine containing not more than 0.02 part by weight of water-insoluble inorganic impurities derived from aluminum chloride per 100 parts by weight of phthalocyanine before halogenation, which comprises the following steps A, B and C;

step A of halogenating phthalocyanine in titanium tetrachloride in the presence of aluminum chloride, step B of evaporating titanium tetrachloride and sublimating aluminum chloride by heating the halogenation reaction mixture, thereby recovering aluminum chloride as a mixture with titanium tetrachloride and obtaining a polyhalogenated phthalocyanine, and step C of recycling aluminum chloride isolated from the mixture with titanium tetrachloride or said mixture to the step A.

5 Claims, No Drawings

PROCESS FOR PRODUCING POLYHALOGENATED PHTHALOCYANINE

FIELD OF THE INVENTION

The present invention relates to a process for producing a polyhalogenated phthalocyanine widely usable as a green pigment. More specifically, it relates to a process for producing a polyhalogenated phthalocyanine having excellent properties of being free from causing abrasion on a printing plate, in which process phthalocyanine is halogenated in titanium tetrachloride in the presence of aluminum chloride.

PRIOR ART OF THE INVENTION

For the industrial halogenation of phthalocyanine, there is conventionally employed a process in which phthalocyanine is chlorinated by dissolving it in a eutectic salt of aluminum chloride and sodium chloride (JP-A-52-155625). In this process, aluminum chloride used in the reaction is abandoned into water and decomposed without recovering it after the chlorination. Therefore, the cost of such aluminum chloride increases, and the aluminum chloride causes a serious problem on effluent treatment. Further, since the aluminum chloride is present as a eutectic salt with sodium chloride, it has been practically impossible to recover it.

The present Applicant has proposed a process for halogenating phthalocyanine in titanium tetrachloride in the presence of aluminum chloride (JP-A-1-279975). However, this process has not disclosed any method of recovering $AlCl_3$, nor has it disclosed any method of recovering $AlCl_3$ and $TiCl_4$.

The polyhalogenated phthalocyanine obtained by the above process is a crude pigment having high aggregating power, and it is wet-milled or treated with sulfuric acid to form a pigment.

The so-obtained polyhalogenated phthalocyanine is combined with a vehicle for a printing ink, etc., and used as a printing ink.

However, a printing ink containing a polyhalogenated phthalocyanine obtained by any one of the above conventional processes causes abrasion on a printing plate and decreases the printing plate life, which problem particularly occurs in the field of gravure printing.

It has been conventionally understood that the printing plate abrasion is primarily due to high hardness of polyhalogenated phthalocyanine. There have therefore been proposed methods in which the polyhalogenated phthalocyanine is subjected to surface treatment with a variety of coating agents, surfactants, resins, etc., in order to improve the polyhalogenated phthalocyanine in printing plate abrasion properties. However, the effects of these methods have not at all been satisfactory.

The present inventors have already found that the above printing plate abrasion is caused by a trace amount of water-insoluble inorganic impurities contained in aluminum chloride, and proposed a polyhalogenated phthalocyanine in which the content of the water-insoluble inorganic impurities is decreased due to the use of purified aluminum chloride (JP-A-2-283754).

SUMMARY OF THE INVENTION

It is an object of the present invention to provide a process for producing a polyhalogenated phthalocyanine by halogenating phthalocyanine in a titanium tetrachloride in the presence of aluminum chloride, in which the aluminum chloride is recovered and the polyhalogenated phthalocyanine is improved in the printing plate abrading properties.

According to the present invention, there is provided a process for producing a polyhalogenated phthalocyanine containing not more than 0.02 part by weight of water-insoluble inorganic impurities derived from aluminum chloride per 100 parts by weight of phthalocyanine before halogenation, which comprises the following steps A, B and C;

step A of halogenating phthalocyanine in titanium tetrachloride in the presence of aluminum chloride, step B of evaporating titanium tetrachloride and sublimating aluminum chloride by heating the halogenation reaction mixture, thereby recovering aluminum chloride as a mixture with titanium tetrachloride and obtaining a polyhalogenated phthalocyanine, and step C of recycling aluminum chloride isolated from the mixture with titanium tetrachloride or said mixture to the step A.

The method of halogenating phthalocyanine in the step A is disclosed in U.S. Pat. No. 4,948,884. That is, aluminum chloride and phthalocyanine are preliminarily stirred in titanium tetrachloride at 50° C. or higher, and then the phthalocyanine is halogenated.

The phthalocyanine used above generally refers to a copper phthalocyanine which is not halogenated or partially halogenated. The central metal may be not only copper but also one of iron, nickel, aluminum and titanium. Further, the central metal may be a mixture of these metals, or the phthalocyanine may be metal-free.

In the step B of the present invention, the halogenation reaction mixture is heated to evaporate the titanium tetrachloride and sublimate the aluminum chloride. As a result, a mixture of titanium tetrachloride with aluminum chloride is recovered, and a polyhalogenated phthalocyanine is obtained. Since the reaction mixture contains a very large amount of titanium tetrachloride, part of the titanium tetrachloride may be physically recovered before the evaporation. The titanium tetrachloride can be easily separated with a generally used solid-liquid separating apparatus such as a decanter, and in view of an energy cost, it is advantageous to carry out the above partial physical recovery.

The titanium tetrachloride and aluminum chloride are recovered from the halogenation reaction mixture while the reaction mixture is hot or after cooled to room temperature or a suitable temperature. However, in view of an energy cost for the evaporation step, it is disadvantageous to cool the reaction mixture unnecessarily.

When the entire amount of titanium tetrachloride is evaporated from the reaction mixture, it is not particularly required to cool the reaction mixture. When part of titanium tetrachloride is recovered from the reaction mixture by solid-liquid separation, the solubility of the solid content increases at a high temperature, and as a result, titanium tetrachloride contains aluminum chloride. In the case of solid-liquid separation, therefore it is preferred to cool the reaction mixture to 100° C. or lower, more preferably 60° C.

After the above optional cooling and partial recovery of titanium tetrachloride, the reaction mixture is heated to 137° C. or higher in an evaporator under atmospheric pressure or reduced pressure to evaporate the titanium tetrachloride. When the evaporation of titanium tetrachloride starts, the sublimation of aluminum chloride also starts concurrently, and the outflowing titanium tetrachloride shows a yellowish color. According as the outflow of titanium tetrachloride becomes moderate with the advancement of the evaporation, the sublimation of aluminum chloride is more clearly observed. If it is more desirable to sublimate aluminum chloride further, it is preferred either to heat the remainder at a high temperature, or to add titanium tetrachloride and evaporate it. With an increase in the evaporation temperature, the titanium tetrachloride is more deeply colored. When the evaporated titanium tetrachloride is cooled, aluminum chloride dissolved in the titanium tetrachloride is precipitated as a yellowish precipitate. The aluminum chloride precipitate is usable in the form of a slurry of titanium tetrachloride, a paste obtained by filtering the slurry or a powder obtained after drying the paste. Depending upon conditions, the recovery of the aluminum chloride is generally 2 to 10% when titanium tetrachloride is evaporated, 10 to 40% when the reaction mixture is further heated, and 40 to 85% when the reaction mixture is heated at a higher temperature.

The recovered aluminum chloride remains intact or active, and can be used for the halogenation of phthalocyanine. That is, it has been found that when phthalocyanine is halogenated in titanium tetrachloride in the presence of the-above recovered aluminum chloride alone, a pigment of the resultant polyhalogenated phthalocyanine is excellent in product quality, and that the pigment is excellently free from causing abrasion on a printing plate.

After the evaporation, the reaction mixture contains a polyhalogenated phthalocyanine and a small amount of aluminum chloride. The reaction mixture is poured into dilute sulfuric acid to decompose a small amount of the aluminum chloride and filtered, and the resultant solid is washed and dried, whereby the polyhalogenated phthalocyanine is obtained.

In the present invention, the recovered aluminum chloride is recycled. An aluminum chloride as an industrial product of a commercial grade is produced by blowing chlorine gas into aluminum. In the production, aluminum is heated approximately up to 700° C. in a reactor made of refractory bricks. Therefore, aluminum chloride having an industrial product purity contains a trace amount of impurities from the refractory bricks, which impurities result in the form plate abrading properties of a printing ink containing a polyhalogenated phthalocyanine pigment. On the other hand, the aluminum chloride recovered in the present invention does not contain such water-insoluble inorganic impurities. Therefore, when the aluminum chloride recovered is used as all or part of the starting aluminum chloride, there can be obtained a polyhalogenated phthalocyanine in which the content of water-insoluble inorganic impurities is reduced. The degree of the purification of aluminum chloride depends upon the amount of aluminum chloride used. In the present invention, there can be used an aluminum chloride which has been purified such that the content of water-insoluble inorganic impurities is not more than 0.02 part by weight per 100 parts by weight of phthalocyanine before the halogenation. The aluminum chloride recovered in the present invention is sufficiently as pure as the above-specified aluminum chloride.

The polyhalogenated phthalocyanine obtained according to the above process of the present invention is formed into a pigment, and combined with a suitable vehicle to form a pigment composition. The resultant pigment composition is excellently free from abrasion on a printing plate.

When the polyhalogenated phthalocyanine of the present invention is used as a printing ink, for example, a gravure ink contains 3 to 20% by weight of the polyhalogenated phthalocyanine of the present invention, 97 to 60% by weight of a vehicle for a gravure ink, and 0 to 20% by weight of other auxiliary or an extender pigment. The vehicle for a gravure ink contains 10 to 50% by weight of a resin mixture, 30 to 80% by weight of a solvent and other auxiliary. The resins for the resin mixture are selected, for example, from gum rosin, wood rosin, tall oil rosin, lime rosin, rosin ester, a maleic acid resin, a polyamide resin, a vinyl resin, nitrocellulose, cellulose acetate, ethyl cellulose, an ethylene-vinyl acetate copolymer resin, a urethane resin, a polyester resin, an alkyd resin, gilsonite, dammar and shellac. The solvent is selected, for example, from a hydrocarbon, an alcohol, ketone, ether alcohol, ether, ester and water.

In the present invention, there can be recovered a greater part of aluminum chloride which cannot be recovered in a conventional process for halogenation of phthalocyanine in the presence of aluminum chloride as a solvent and/or as a catalyst. This recovery decreases the cost for the production of a halogenated phthalocyanine, and eases the effluent treatment.

The recovered aluminum chloride is free from water-insoluble inorganic impurities contained in an industrially produced aluminum chloride. Therefore, a printing ink containing the polyhalogenated phthalocyanine obtained in the present invention does not cause the deterioration of a printing plate, which is inevitable when a printing ink containing a pigment obtained according to any conventional process is used. When the polyhalogenated phthalocyanine obtained in the present invention is used, the abrasion loss of a printing plate is remarkably low as compared with a case when a conventional polyhalogenated phthalocyanine obtained by the halogenation in a eutectic salt of aluminum chloride and sodium chloride. The abrasion loss resulting from the use of the polyhalogenated phthalocyanine obtained in the present invention is as small as that resulting from the use of copper phthalocyanine.

The present invention will be detailed hereinafter by reference to Examples, in which "part" stands for "part by weight" and "%" stands for "% by weight".

1. RECOVERY OF ALUMINUM CHLORIDE

Example 1-1

A reactor was charged with 3,000 parts of titanium tetrachloride, 300 parts of copper phthalocyanine and 210 parts of industrially produced aluminum chloride A (described in Table 1), and while the mixture was stirred, the temperature inside the reactor was increased up to 110° to 115° C. While this temperature was kept, the mixture was stirred for 8 hours. Then, the temperature was increased to 135° to 137° C., and while this temperature was kept, a chlorine gas was introduced at a flow rate of 30 parts per hour for 5 hours. Then, 90 parts of industrially produced aluminum chloride A, and a chlorine gas was further introduced at the same flow rate for 5 hours. Thereafter, 30 parts of industrially produced aluminum chloride A was added, and a chlorine gas was further introduced at the same flow rate for 18 hours.

The reaction mixture was charged into an evaporator having a powerful stirrer, and subjected to evaporation while the reaction was stirred. When the temperature inside the evaporator reached 150° C., the mixture was further subjected to evaporation for 2 hours to recover titanium tetrachloride and yellowish aluminum chloride. The recovered mixture was cooled to room temperature, and filtered under a nitrogen atmosphere, and the remaining solid was promptly washed with carbon tetrachloride and dried to give 60 parts of a recovered aluminum chloride (recovery 18.2%).

Example 1-2

The same chlorination as that in Example 1-1 was repeated, and the resultant reaction mixture was subjected to evaporation. When the temperature inside the evaporator reached 170° C., the reaction mixture was further subjected to evaporation at 170° C. to recover titanium tetrachloride and yellowish aluminum chloride. The recovered mixture was cooled to room temperature, and filtered under a nitrogen atmosphere, and the remaining solid was promptly washed with carbon tetrachloride and dried to give 115 parts of a recovered aluminum chloride (recovery 34.8%).

Example 1-3

The same chlorination as that in Example 1-1 was repeated, and the resultant reaction mixture was subjected to evaporation. When the temperature inside the evaporator reached 200° C., the reaction mixture was further subjected to evaporation at 200° C. to recover titanium tetrachloride and yellowish aluminum chloride. The recovered mixture was cooled to room temperature, and filtered under a nitrogen atmosphere, and the remaining solid was promptly washed with carbon tetrachloride and dried to give 223 parts of a recovered aluminum chloride (recovery 67.6%).

Example 1-4

300 Parts of copper phthalocyanine was chlorinated in 3,000 parts of titanium tetrachloride in the presence of 330 parts of aluminum chloride as an industrial product A in the same manner as in Example 1-3, and the resultant reaction mixture was subjected to evaporation in the same manner as in Example 1-3 to give a mixture of titanium tetrachloride with a yellowish aluminum chloride. The mixture was cooled to room temperature, and then allowed to stand for one day to precipitate the aluminum chloride. The titanium tetrachloride was removed by decantation to give 715 parts of a titanium tetrachloride slurry containing 30% of aluminum chloride (214 parts of aluminum chloride, recovery 64.8%).

DETERMINATION OF AMOUNT OF WATER-INSOLUBLE INORGANIC IMPURITIES

The amount of water-insoluble inorganic impurities in aluminum chloride was determined as follows.

100 Parts of aluminum chloride was gradually poured into 1,000 parts of ice water. The mixture was heated up to 80° C. and stirred for 30 minutes to decompose the aluminum chloride completely. The resultant acidic solution was filtered with a glass filter of which the weight had been rendered constant (glass filter G4, supplied by Shibata Kagaku Kikai Kogyo, K. K.), and the filtration remainder was fully washed with dilute hydrochloric acid, then fully washed with distilled water, and dried. The filter was measured for a weight. The increase in the weight of the filter corresponds to the amount of the water-insoluble inorganic impurities. Table 1 shows the results of measurement of the water-insoluble inorganic impurities contained in the aluminum chlorides recovered in Examples 1-1 to 1-4 and an industrial product.

TABLE 1

| Sample | Content of impurities*1 (part) |
|---|---|
| Example 1-1 | 0.0011 |
| Example 1-2 | 0.0007 |
| Example 1-3 | 0.0015 |
| Example 1-4 | 0.0014 |
| Industrial product A | 0.0195 |
| Industrial product B | 0.0175 |

Note
Amount per 100 parts by weight of aluminum chloride

2. PRODUCTION OF POLYHALOGENATED PHTHALOCYANINE

Example 2-1

A reactor was charged with 600 parts of titanium tetrachloride, 50 parts of copper phthalocyanine and 38 parts of the aluminum chloride recovered in Example 1-1, and while the mixture was stirred, the temperature inside the reactor was increased up to 110° to 115° C. While this temperature was kept, the mixture was stirred for 8 hours. Then, the temperature was increased to 135° to 137° C., and while this temperature was kept, a chlorine gas was introduced at a flow rate of 5 parts per hour for 5 hours. Thereafter, 12 parts of the aluminum chloride recovered in Example 1-1 was added, and a chlorine gas was further introduced at the same rate for 5 hours. Further, 12 parts of the aluminum chloride recovered in Example 1-1 was added, and a chlorine gas was introduced at the same flow rate for 5 hours. Furthermore, 10 parts of the aluminum chloride recovered in Example 1-1 was added, and a chlorine gas was introduced at the same flow rate for 8 hours. The reaction mixture was charged into an evaporator having a powerful stirrer, and subjected to evaporation under heat with stirring to recover aluminum chloride and titanium tetrachloride. The remaining magma was put into 1,000 parts of 5% sulfuric acid, and the mixture was stirred at 90° C. for 1 hour and then filtered. The remainder was washed with water and dried to give 89 parts of a green polychorinated copper phthalocyanine.

The analysis of the above polychlorinated copper phthalocyanine with fluorescent X-rays showed that 15.6 chlorine atoms per copper phthalocyanine molecule had been introduced.

Example 2-2

60 Parts of the aluminum chloride recovered in Example 1-2, 600 parts of titanium tetrachloride and 50 parts of copper phthalocyanine were treated in the same manner as in Example 2-1 to give 88 parts of a polychlorinated copper phthalocyanine. The analysis thereof with fluorescent X-rays showed that 15.7 chlorine atoms per copper phthalocyanine molecule had been introduced.

Example 2-3

60 Parts of the aluminum chloride recovered in Example 1-3, 600 parts of titanium tetrachloride and 50 parts of copper phthalocyanine were treated in the same manner as in Example 2-1 to give 88 parts of a polychlorinated copper phthalocyanine. The analysis thereof with fluorescent X-rays showed that 15.6 chlorine atoms per copper phthalocyanine molecule had been introduced.

Example 2-4

40 Parts of the aluminum chloride recovered in Example 1-3, 20 parts of an industrially produced aluminum chloride, 650 parts of titanium tetrachloride and 50 parts of copper phthalocyanine were treated in the same manner as in Example 2-1 to give 88 parts of a polychlorinated copper phthalocyanine. The analysis thereof with fluorescent X-rays showed that 15.8 chlorine atoms per copper phthalocyanine molecule had been introduced.

Example 2-5

A reactor was charged with 600 parts of titanium tetrachloride, 50 parts of copper phthalocyanine and 38 parts of the aluminum chloride recovered in Example 1-3, and while the mixture was stirred, the temperature inside the reactor was increased up to 110° to 115° C. While this temperature was kept, the mixture was stirred for 8 hours. Then, the temperature was increased to 135° to 137° C., and while this temperature was kept, bromine was introduced at a flow rate of 5 parts per hour for 5 hours. Thereafter, 12 parts of the aluminum chloride recovered in Example 1-3 was added, and bromine was introduced at the same flow rate for 5 hours. Further, 10 parts of the aluminum chloride recovered in Example 1-3 was added, and bromine was introduced at the same flow rate for 18 hours. Thereafter, the reaction was further continued for 200 hours. After the reaction, the reaction mixture was treated in the same manner in Example 2-1 to give 110 parts of a green polybrominated copper phthalocyanine.

Example 2-6

A reactor was charged with 127 parts of the titanium tetrachloride slurry containing 30% of aluminum chloride recovered in Example 1-4, 511 parts of titanium tetrachloride and 50 parts of copper phthalocyanine, and while the mixture was stirred, the temperature inside the reactor was increased up to 110° to 115° C. While this temperature was kept, the mixture was stirred. Then, the temperature was increased to 135° to 137° C., and while this temperature was kept, a chlorine gas was introduced at a flow rate of 5 parts per hour for 5 hours. Thereafter, 40 parts of the titanium tetrachloride slurry containing aluminum chloride recovered in Example 1-4 was added, and a chlorine gas was introduced at the same flow rate for 5 hours. Further, 33 parts of the titanium tetrachloride slurry containing aluminum chloride recovered in Example 1-4 was added, and a chlorine gas was introduced at the same flow rate for 18 hours. After the introduction, the reaction mixture was treated in the same manner as in Example 2-1 to give 89 parts of a polychlorinated copper phthalocyanine. It was found that 15.7 chlorine atoms per copper phthalocyanine molecule had been introduced.

Comparative Example 2-1

60 Parts of an industrially produced aluminum chloride A, 550 parts of titanium tetrachloride and 50 parts of copper phthalocyanine were treated in the same manner as in Example 2-1 to give 87 parts of a polychlorinated copper phthalocyanine.

3. PRINTING PLATE ABRASION TEST

Preparation of printing inks

The polyhalogenated phthalocyanines obtained in Examples 2-1 to 2-6 and Comparative Example 2-1 were respectively wet-milled together with sodium chloride to form pigments.

The resultant polyhalogenated phthalocyanine pigments were respectively prepared into ink compositions as follows.

First, a vehicle was prepared by stirring a mixture consisting of 500 parts of nitrocellulose, 100 parts of dioctyl phthalate, 300 parts of ethyl acetate and 2,000 parts of methanol with a high-speed stirrer until these components formed a uniform mixture. 40 Parts of the pigment, 250 parts of the vehicle and 2,000 parts of steel balls (11/16 inch $\phi$) were weighed out, and dispersed in a vibration mill for 3 hours. The steel balls were removed from the resultant composition, and the composition was adjusted to a viscosity of 25 seconds (Zahn cup No. 3) with a solvent mixture (methanol:ethyl acetate=6:1).

Printing plate abrasion test

The above-obtained ink compositions were respectively tested on printing plate abrasion with a plate abrasion tester ATII (supplied by Shroeder) as follows. A test plate which had been accurately weighed was set at the plate abrasion tester, and treated with 350 g of the ink composition at a rate of 125,000 turns (doctor blade contact 500,000 times). The test plate was taken off the plate abrasion tester, fully washed with a solvent, dried and accurately weighed. The resultant loss in the test plate weight was taken as a plate abrasion loss. Table 2 shows the results.

TABLE 2

| Sample | Content of impurities[*2] (part) | Plate abrasion loss (mg) |
| --- | --- | --- |
| Example 2-1 | 0.0014 | 5.9 |
| Example 2-2 | 0.0008 | 5.3 |
| Example 2-3 | 0.0018 | 6.4 |
| Example 2-4 | 0.0090 | 11.3 |
| Example 2-5 | 0.0021 | 6.9 |
| Example 2-6 | 0.0015 | 6.2 |
| Comparative Example 2-1 | 0.0234 | 26.7 |
| Copper phthalocyanine | 0.0000 | 4.7 |

[*2]Value per 100 parts of phthalocyanine before halogenation

What is claimed is:

1. A process for producing a polyhalogenated phthalocyanine containing not more than 0.02 part by weight of water-insoluble inorganic impurities derived from aluminum chloride per 100 parts by weight of phthalocyanine before halogenation, which comprises the following steps A, B and C;
   step A halogenating phthalocyanine in titanium tetrachloride in the presence of aluminum chloride,
   step B evaporating titanium tetrachloride and sublimating aluminum chloride by heating the halogenation reaction mixture, thereby recovering aluminum chloride as a mixture with titanium tetrachloride and obtaining a polyhalogenated phthalocyanine, and
   step C recycling aluminum chloride isolated from the mixture with titanium tetrachloride or said mixture to step A.

2. A process according to claim 1, wherein polyhalogenated phthalocyanine in the step B is obtained as a remainder by evaporation of the halogenation reaction mixture.

3. A process according to claim 1, wherein the titanium tetrachloride is partly recovered from the halogenation reaction mixture before evaporation.

4. A process according to claim 1, wherein the phthalocyanine before the halogenation has a central metal selected from the group consisting of copper, iron, nickel, aluminum and titanium.

5. A process according to claim 1, wherein the phthalocyanine before the halogenation has no central metal.

* * * * *